United States Patent [19]

Negishi et al.

[11] Patent Number: 4,465,576
[45] Date of Patent: Aug. 14, 1984

[54] METHOD FOR SURFACE TREATMENT OF CARBON CATALYST

[75] Inventors: Akira Negishi, Yatabemachi; Ken Nozaki, Ibaraki, both of Japan

[73] Assignees: Agency of Industrial Science & Technology; Ministry of International Trade & Industries, both of Tokyo, Japan

[21] Appl. No.: 475,948

[22] Filed: Mar. 16, 1983

[30] Foreign Application Priority Data

Mar. 24, 1982 [JP] Japan .................................. 57-46706

[51] Int. Cl.³ ............................................ C23C 15/00
[52] U.S. Cl. ............................ 204/192 E; 156/623 R; 502/180
[58] Field of Search .................... 204/192 E; 156/623; 502/180

[56] References Cited

PUBLICATIONS

Baker et al., Thin Solid Films, 69, (1980), pp. 359-368.
Berg et al., J. Vac. Sci. Tech. 13, (1976), pp. 403-405.
DeGraf et al., J. Vac. Sci. Tech., 16 (1979), pp. 1906-1908.
Holland et al., Vacuum; 26 (1976), pp. 233-236.
Rizk et al., Vacuum 27, (1977), pp. 601-604.

*Primary Examiner*—Arthur P. Demers
*Attorney, Agent, or Firm*—Schwartz & Weinrieb

[57] ABSTRACT

A carbon catalyst is activated by subjecting the carbon catalyst to a treatment of dry etching utilizing the activity of low-temperature plasma generated by electric discharge under vacuum.

4 Claims, 7 Drawing Figures

METHOD FOR SURFACE TREATMENT OF CARBON CATALYST

FIELD OF THE INVENTION

This invention relates to a method for surface treatment to activate such carbon catalysts as those for use in chemical processes and catalytically active carbon electrodes for use in fuel cells and redox-flow type secondary batteries.

BACKGROUND OF THE INVENTION

Carbon is a chemically stable substance. Numerous types of carbon catalysts (activated carbon) are produced by various methods of manufacture and various methods of activation. For example, a method which comprises impregnating peat or wood chips with an aqueous metal chloride solution and then carbonizing the resultant impregnation product at elevated temperatures, a method which comprises causing the surface of carbon or graphite to be reacted upon by steam, air, or carbon dioxide gas at elevated temperatures thereby effecting oxidizing etching of the surface, a method which comprises immersing carbon in a hot bath of concentrated phosphoric acid, and a method which comprises impregnating carbon with sodium hydroxide or a thiocyanate and subsequently subjecting the impregnated carbon to a thermal treatment thereby etching the surface of carbon have been known to the art.

These methods which involve surface etching of carbon, however, have the following common drawbacks.

(I) Since hot or corrosive chemical substances are used for etching, these methods can not be applied to composite carbon materials prepared by incorporation of substances deficient in resistance to heat and corrosion (high molecular substances).

(II) Chemical substances used for etching tend to remain in the produced carbon catalysts and give rise to impurities.

(III) Disposal of the chemical substances used in etching tends to cause environmental pollution.

(IV) The etching processes involved are not easy to control and manage.

For the solution of these problems, the conventional wet etching method has been switched to the dry etching method in the process for manufacture of semiconductors, for example. This fact suggests that establishment of a suitable dry etching method, therefore, will suffice for the solution.

OBJECTS OF THE INVENTION

This invention has been perfected to overcome the drawbacks mentioned above. An object of the invention is to provide a method for surface treatment capable of notably enhancing the activity of a carbon catalyst.

SUMMARY OF THE INVENTION

To accomplish the object described above according to this invention, there is provided a method for the surface treatment of a carbon catalyst, which comprises treating the carbon catalyst by dry etching utilizing the activity of a low-temperature plasma generated by electric discharge under low pressure thereby coarsening the surface of the carbon catalyst and enhancing the activity of the carbon catalyst. Since this invention effects desired activation of a carbon catalyst without using any chemical substance as described above, it does not entail the drawbacks due to the actions of chemical substances used in the conventional methods for the activation of carbon catalysts.

BRIEF DESCRIPTION OF THE DRAWINGS

The other objects and characteristic features of the present invention will become apparent to those skilled in the art as the disclosure is made in the following description of a preferred embodiment of the invention, as illustrated in the accompanying drawing.

DESCRIPTION OF PREFERRED EMBODIMENT

Figure 1:
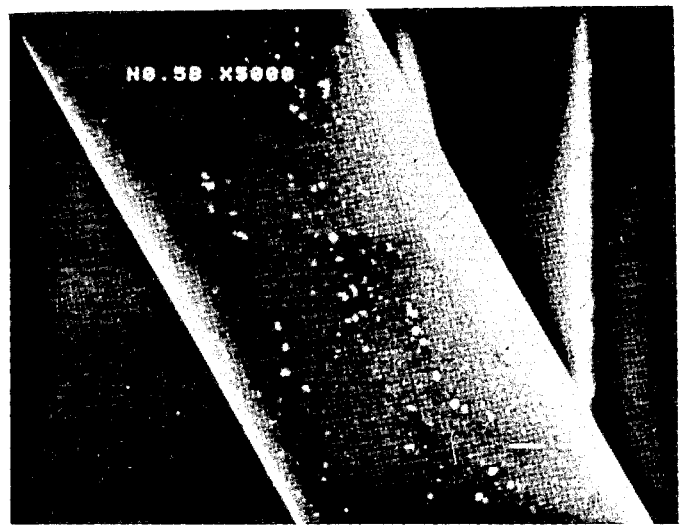
FIG. 1 is a photomicrograph of untreated carbon fibers.

Dry etching is used to cause a chemical reaction between a gaseous reactant and a solid reactant or physical phenomenon of sputtering by utilizing the activity of a low-temperatue plasma generated by electric discharge under low pressure. Thus, it has the advantage that it obviates the necessity for those chemical substances used heretofore in the conventional hot treatment or wet treatment and it permits the etching process to be controlled and managed with accuracy. This invention is aimed at enhancing the activity of a carbon catalyst by coarsening the surface of the carbon catalyst using the aforementioned dry etching.

Dry etching is of two general types: plasma etching and sputter etching.

Plasma etching method is one form of chemical etching which makes use of a chemical reaction. It is effected by placing a given carbon catalyst in a vacuum tank, exciting within the vacuum tank such a reactive gas as oxygen or air under a gas pressure on the order of 0.1 to 10 Torrs by means of a plasma, causing the resultantly produced reacting group to induce a chemical reaction with the carbon on the surface of the carbon catalyst, and allowing the gaseous reaction product to escape from the reaction system into the ambient air. When oxygen is used as the reactive gas, the chemical reaction involved in this plasma etching is represented by the following chemical formula. Carbon dioxide gas occurs as the reaction product, which is evacuated out of the reaction system as described above.

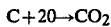

$$C + 2O \rightarrow CO_2$$

By the aforementioned chemical reaction, the surface of the carbon catalyst is coarsened. At the same time, organic substances adhering to the surface of the carbon catalyst also react with the reacting group and the resultant reaction products in a gaseous form are released out of the reaction system. Thus, the carbon catalyst which has undergone the plasma etching acquires a clean surface. Since the reaction product which is evacuated out of the reaction system is preponderantly carbon dioxide gas, the plasma etching does not entail the problem of environmental pollution. Further, the technique of plasma etching has been fully developed in the process for the manufacture of semiconductors. Automation of this technique, therefore, can be accomplished with ease.

The sputter etching method is divided into inactive sputter etching which uses argon gas and reactive sputter etching which uses a reactive gas such as oxygen, nitrogen, or air. In either form, the sputter etching is effected by placing a carbon catalyst in a vacuum tank, effecting electric discharge in the vacuum tank under a gas pressure on the order of $10^{-1}$ to $10^{-3}$ Torr, and causing the resultant ionized argon, nitrogen, or oxygen to sputter the surface of the carbon catalyst and beat carbon atoms out of the surface thereby coarsening the surface of the carbon catalyst. In the case of the reactive sputtering, the carbon atoms beaten out of the surface of the carbon catalyst react with oxygen to produce carbon dioxide gas, which is released from the reaction system into the ambient air. In the case of the inactive sputtering using argon gas, the effect of sputter is about twice as high as the sputter effect of oxygen. This inactive sputtering, however, has the possibility of causing the interior of the vacuum tank to be defiled with carbon atoms beaten out of the surface of the carbon catalyst. This possibility may be precluded by mixing the inactive gas with oxygen, so that the carbon atoms beaten out of the surface of the carbon catalyst will react with the oxygen and will be prevented from defiling the interior of the vacuum tank. Consequently, the etching can be carried out effectively.

The aforementioned sputtering gives the carbon catalyst a clean surface because it beats inorganic substances and other impurities out of the surface of the carbon catalyst. Similar to the plasma etching, sputter etching does not produce any reaction product which might cause environmental pollution. Moreover, it can be automated with ease.

Examples of the carbon catalyst suitable for the treatment of the present invention include activated carbons for use in chemical processes such as halogenation, oxidation, and dehydrogenation and catalytically active carbon electrodes for use in fuel cells and redox-flow type batteries. The dry etching of the present invention brings about an effect of forming etched pits throughout the entire surface of the carbon catalyst thereby coarsening the surface and increasing the surface area and an effect of removing impurities from the surface of the carbon catalyst. Thus, the dry etching is effective in activating the carbon catalyst, enhancing the activity of the carbon catalyst, and reactivating the carbon catalyst.

At present, studies are being made for the development of redox-flow type secondary batteries. Carbon materials are used as electrodes in such batteries. To promote the improvement of battery performance, addition of catalysts to these electrodes has been tried. By adopting the method of this invention, such electrodes are allowed to acquire increased surface areas and manifest enhanced performance without being increased in size.

As described in detail above, this invention effects activation of a carbon catalyst by coarsening the surface of the carbon catalyst by subjecting the surface to a process of dry etching. Thus, those composite carbon materials on which the conventional wet treatment has failed to effect activation can be advantageously activated by the method of this invention. Besides, the method of this invention has no need for chemical substances and, therefore, has no possibility of giving rise to impurities which are liable to cause environmental pollution. It also enjoys the advantage that the etching process is easy to control and manage.

Now, this invention will be described more specifically below with reference to working examples.

EXAMPLE 1

Carbon fibers 5 to 10 μm in diameter produced from polyacrylonitrile were set in position in an etching device provided with planar electrodes disposed parallelly to each other at a distance of 60 mm. By feeding an electric power of 600 W to the electrodes and a flow of oxygen gas into the device, the carbon fibers were subjected to sputter etching for 30 minutes under the conditions of 13.56 MHz of frequency and $2 \times 10^{-2}$ Torr of initial gas pressure.

Figure 2:
FIG. 2 is a photomicrograph of carbon fibers which have been treated in accordance with this invention.
Figure 3:
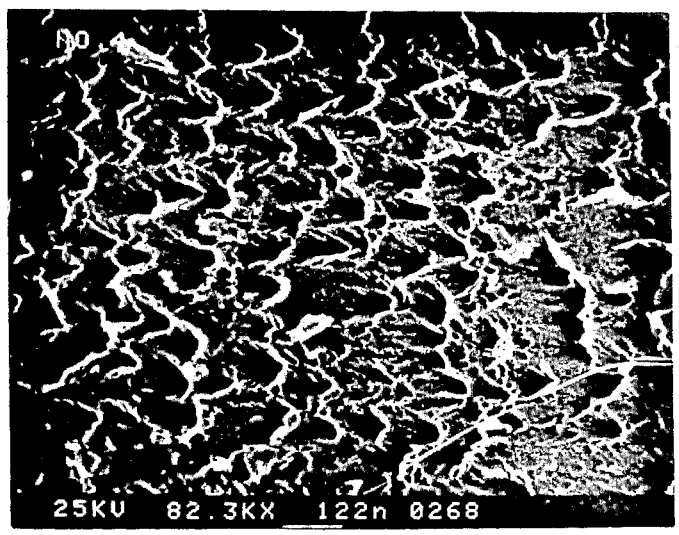
FIG. 3 is a photomicrograph showing the carbon fibers of FIG. 2 in increased magnification.

FIG. 1 is a photograph of the carbon fibers of polyacrylonitrile taken through a scanning electron microscope at 5000 magnifications before the surface treatment. FIG. 2 is a 5000-magnification photomicrograph of the same carbon fibers taken after the carbon fibers were subjected to the surface treatment by sputter etching. FIG. 3 is a photomicrograph of the same carbon fibers taken at 82300 magnifications.

It is noted from these photomicrographs that when the carbon fibers were subjected to the sputter etching, etched pits some hundreds of Angstroms in diameter were formed throughout the entire surface of the carbon fibers. It should be noted in this connection that formation of such pits has been attained by the conventional etching method only with great difficulty.

Figure 4:
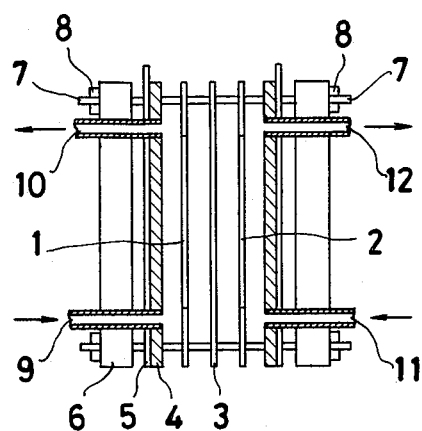
FIG. 4 is a schematic diagram of the construction of a redox-flow type secondary battery using typical carbon fibers of this invention as electrodes.

By adopting as electrodes (catalysts) the carbon fibers which had been activated by the sputter etching treatment described above, a redox-flow type secondary battery was set up as illustrated in FIG. 4.

In the diagram of FIG. 4, 1 denotes a negative carbon cloth electrode, 2 a positive carbon cloth electrode, 3 a cation-exchange membrane, 4 a carbon plate, 5 a copper plate, 6 a retainer plate, 7 a bolt, 8 a nut, 9 and 10 respectively a catholyte inlet and a catholyte outlet, and 11 and 12 respectively an anolyte inlet and an anolyte outlet. The carbon cloth electrodes 1, 2 are formed of the carbon fibers activated by the surface treatment of the present invention.

In the redox-flow type secondary battery set up as described above, a hydrochloric-acid aqueous iron chloride solution was used as the anolyte and a hydrochloric-acid aqueous chromium chloride solution was used as the catholyte and the carbon cloth electrodes were formed of a varying lot of carbon fibers, that is, the carbon fibers obtained by the sputter etching treatment performed under varying sets of conditions such as 280 W of output power and 30 minutes of duration, 280 W of output power and 90 minutes of duration, 280 W of output power and 150 minutes of duration, and 600 W of output power and 30 minutes of duration. During the sputter etching treatment, various measurements were made for determining the relation between the amount of etching and the cell conductivity, the relation between the etching conditions and the electrode performance, the relation between the current efficiency and the cell conductivity, and the comparison of electrode performance before and after the etching treatment.

Figure 6:
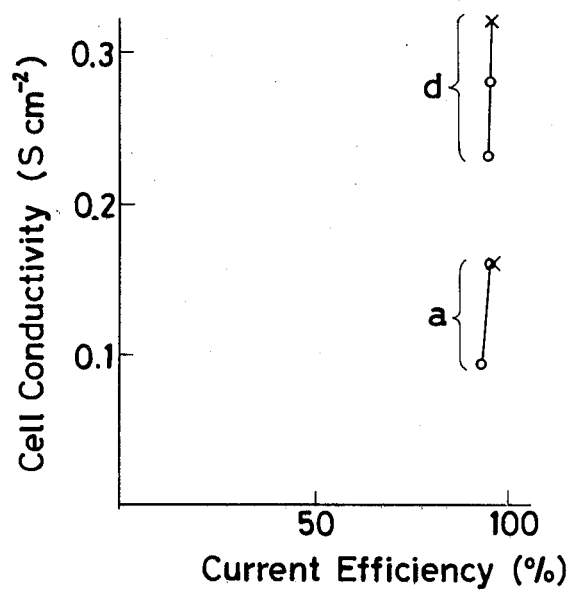
FIG. 6 is a graph showing the relation between the current efficiency and the cell conductivity similarly involved in the sputter etching.
Figure 5:
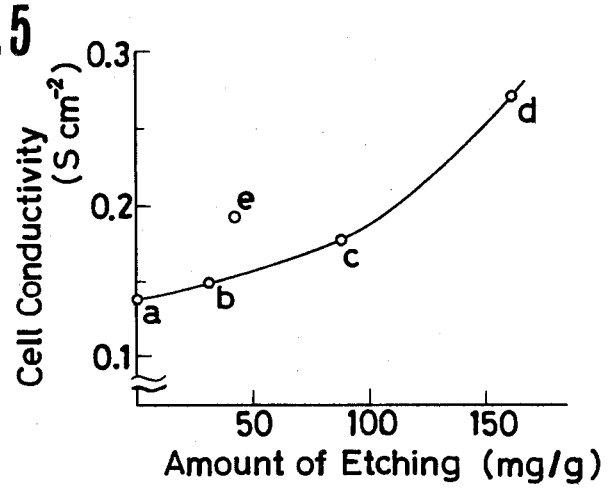
FIG. 5 is a graph showing the relation between the amount of etching and the cell conductivity involved in the sputter etching of this invention.

The former results are shown in FIG. 5 and the latter results are shown in FIG. 6.

In the graph of FIG. 5, the point b represents the data obtained of the carbon cloth electrode of carbon fibers which had undergone the treatment of this invention under the conditions of 280 W of output power and 30 minutes of duration, the point c the data similarly involving the conditions of 280 W of output power and 90 minutes of duration, the point d of the data involving the conditions of 280 W of output power and 150 minutes of duration, and the point e the data involving the conditions of 600 W of output power and 30 minutes of duration, whereas the point a represents the data obtained of the carbon cloth electrode formed of carbon fibers which had not undergone the treatment of this invention for the purpose of comparison. In the graph, the horizontal axis is the scale for the amount of etching (mg/g) and the vertical axis the scale for the cell conductivity ($S.cm^{-2}$). The term "cell conductivity" refers to the value calculated from the current-potential curve of a given battery and indicates the battery performance.

It is noted from FIG. 5 that the etching treatment generally increased the cell conductivity as compared with the untreated electrode a. It is further noted that the degree of this increase was proportionate to the amount of etching. In the case of the treated electrode e, however, the cell conductivity was high in spite of a small amount of etching. This fact suggests that the mechanism of etching effected on carbon fibers is greatly affected by the sputter output.

In the graph of FIG. 6, the horizontal axis is the scale for current efficiency (%) and the vertical axis is the scale for cell conductivity ($S.cm^{-2}$), the point X represents the data obtained by charging and discharging at 600 mA, the point represents the data obtained by charging and discharging at 400 mA, and the point ● represents the data obtained by charging and discharging at 200 mA. The symbols a and d represent the untreated electrodes and treated electrodes of FIG. 5.

It is noted from FIG. 6 that in the untreated electrode a, the cell conductivity was 0.16 $S.cm^{-2}$ even during the charging and discharging at 600 mA, a current expected to give a high cell conductivity. In the treated electrode d, however, owing to the sputter etching treatment, the cell conductivity was as high as 0.23 $S.cm^{-2}$ even during the charging and discharging at 200 mA, a current expected to give a low cell conductivity.

Comparison of the outcomes of charging and discharging at a given current reveals that the cell conductivity of the treated electrode was about twice as high as that of the untreated electrode, indicating that the adoption of this invention serves to improve the battery performance to a great extent.

EXAMPLE 2

Composite graphite plates obtained by binding graphite powder with a phenolic resin were subjected to a surface treatment by sputter etching under the conditions of a fixed output power of 280 W and a varying duration of 60 minutes, 120 minutes, or 240 minutes. The composite graphite plates thus treated were observed under a scanning electron microscope. This observation ascertained that the surfaces of the plates were coarsened and, consequently, acquired increased surface areas.

In a redox-flow type secondary battery of the same construction as used in Example 1, the composite graphite plates which had undergone the etching treatment described above were used as electrodes. In all the samples used, the values of cell conductivity were about 1.5 times those of the electrodes formed of corresponding untreated samples of composite graphite plates.

Figure 7:
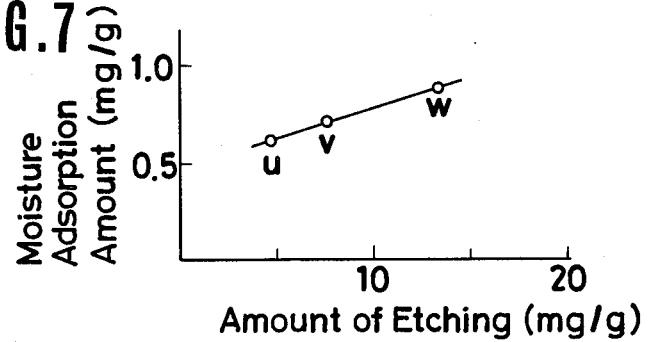
FIG. 7 is a graph showing the relation between the amount of etching and the amount of moisture adsorption similarly involved in the sputter etching.

To confirm that the surfaces of the treated composite graphite plates were coarsened, measurements were made for determining the relation between the amount of etching and the amount of moisture adsorption. The results were as shown in FIG. 7. In the graph of FIG. 7, the point u represents the data obtained of a composite graphite plate treated by the method of this invention under the conditions of 280 W of output power and 60 minutes of duration, the point v the data similarly obtained under the conditions of 280 W of output power and 120 minutes of duration, and the point w the data similarly obtained under the conditions of 280 W of output power and 240 minutes of duration.

From FIG. 7, it is noted that the amount of moisture adsorption increased in proportion to the increased amount of etching.

EXAMPLE 3

Carbon fibers produced from viscose rayon were set in position within a plasma etching device which was displaced with oxygen as a reactive gas to a pressure of 0.5 Torr. By feeding an electric power of 2.0 KV and 0.25 A to the anode, plasma was generated within the device. Under the plasma, the carbon fibers were treated for 60 minutes. Subsequently, the carbon fibers were activated by being subjected to steam etching for 30 minutes. When these carbon fibers were tested for surface area by the BET method, they were found to have a surface area 60% greater than the surface area of the same carbon fibers which had undergone only the steam etching treatment for 30 minutes. When these carbon fibers were used as activated carbon, they were found to exhibit an improvement in adsorption property in proportion to the aforementioned difference of surface area.

Obviously, many modifications and variations of the present invention are possible in light of the above teachings. It is therefore to be understood that within the scope of the appended claims, the present invention may be practiced otherwise than as specifically described herein.

We claim:

1. A method for enhancing the catalytic activity of a carbon catalyst, comprising the steps of:
    disposing said carbon catalyst within a vacuum tank;
    exciting a reactive gas with plasma under a gas pressure within said vacuum tank of from 0.1 to 10 Torrs; and
    exposing said carbon catalyst to the reacting group produced within said reactive gas for contact therewith for coarsening the surface of said carbon catalyst so as to increase the surface area of said carbon catalyst and thereby achieve said enhanced catalytic activity.

2. A method according to claim 1, wherein said reactive gas is oxygen.

3. A method for enhancing the catalytic activity of a carbon catalyst, comprising the steps of:
    disposing said carbon catalyst within a vacuum tank;

subjecting an etching gas to electric discharge under a gas pressure within said vacuum tank of from $10^{-1}$ to $10^{-3}$ Torrs; and exposing said carbon catalyst to the ionized etching gas for contact therewith for effecting sputtering of the surface of said carbon catalyst which will coarsen said surface of said carbon catalyst and increase the surface area of said carbon catalyst thereby achieving said enhanced catalytic activity.

4. A method according to claim 3, wherein said etching gas is at least one member selected from the group consisting of oxygen and argon.

* * * * *